United States Patent Office 2,985,823
Patented May 23, 1961

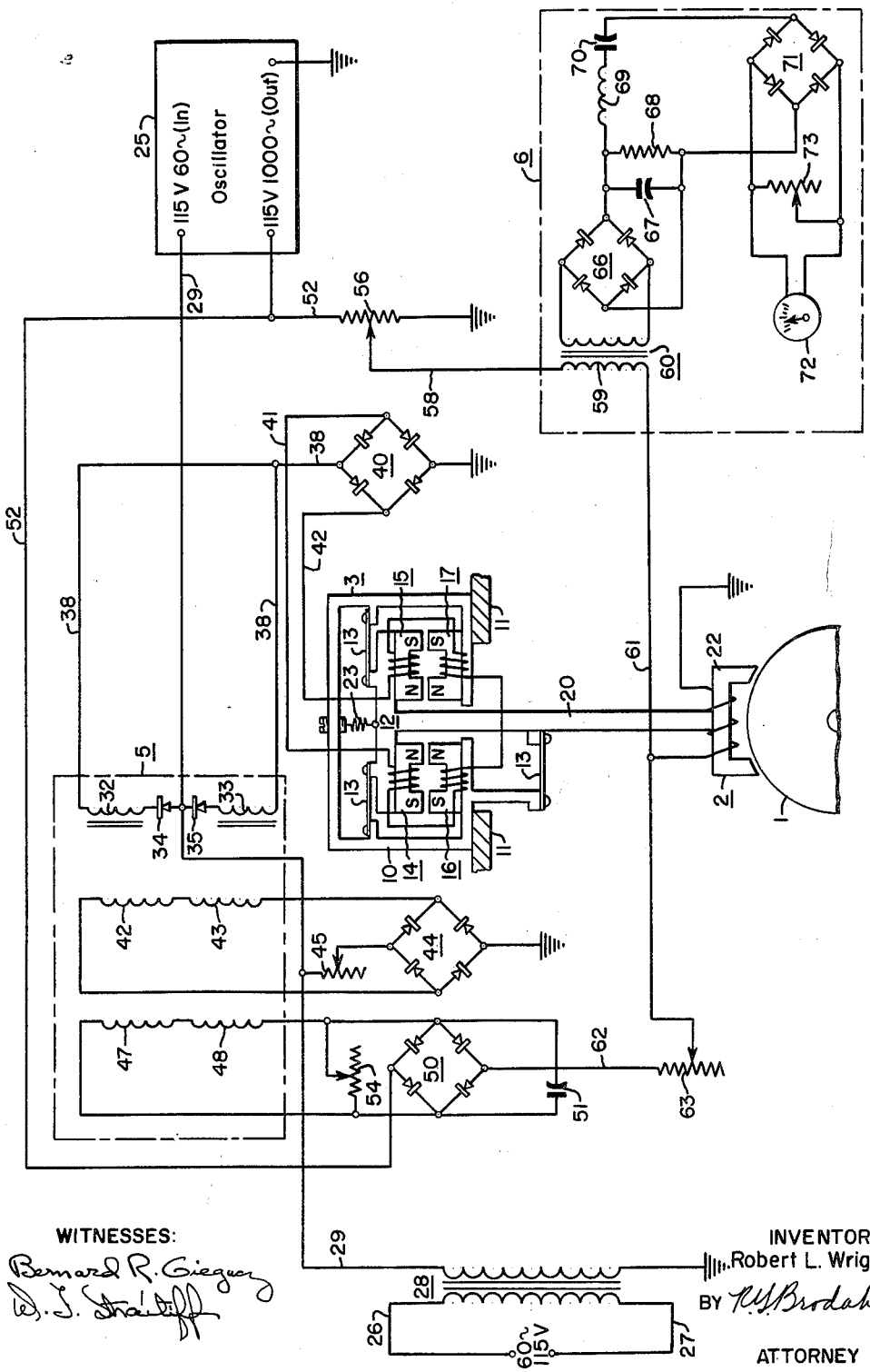

2,985,823

VIBRATION DETECTOR DEVICE

Robert L. Wright, Jr., North Linthicum, Md., assignor to Westinghouse Electric Corporation, East Pittsburgh, Pa., a corporation of Pennsylvania Filed Sept. 3, 1958, Ser. No. 758,861

2 Claims. (Cl. 324—34)

This invention relates to a vibration detector device particularly adapted for determining the degree of vibration of a rotating member, such as a turbine shaft, for example.

In machines such as steam turbines, it is necessary to detect the amount of vibration occurring in the shaft of the steam turbine during its operation in order to be able to prevent damage to the turbine blades should such vibration tend to become excessive. Devices utilized heretofore proposed for determining the amount of vibration in steam turbine shafts have employed pickup coil means mounted in inductive coupling with the turbine shaft, in order to avoid the use of mechanical shaft rubbing elements. Such arrangement of the pickup coil in attachment to the turbine casing may impose a limitation on the sensitivity of the pickup where casing and pickup are vibrating out of phase and relative vibratory movement therebetween may be less than that of the shaft relative to space. Furthermore, during the period in which shaft vibration is being detected, the shaft may shift position in its journal and thereby move relative to the casing-mounted vibration pickup coil, with consequent change in the sensitivity of the vibration detection equipment due to the change in inductive coupling between coil and shaft.

In view of the above it becomes a prime object of the present invention to provide an improved vibration detector device of the type which avoids the use of mechanical elements engaging the shaft.

Other objects, purposes and characteristic features of the invention will become obvious from subsequent description of the invention when taken in connection with the accompanying drawing, in which the single figure is a schematic view of a preferred embodiment of this invention.

The vibration detector device embodying the invention is particularly adapted for employment to detect the magnitude of vibration of a rotatable member 1 which may be a turbine shaft, and such device comprises, in general, signal producing means including a pickup coil means 2 disposed adjacent to the rotatable member 1 as inductance means variable according to the degree of its proximity to such shaft, hence, according to the magnitude of vibration of such rotatable member 1; pickup coil position adjusting means 3 for adjusting position of the pickup coil means 2 relative to the rotatable member 1; means 5 controlled by the pickup coil means 2 to control operation of the pickup coil position adjusting means 3; and means 6 responsive to the vibration signal produced by the pickup coil means 2 to effect indication of the extent of vibration of rotatable member 1.

According to a feature of the invention, the pickup coil position adjusting means 3 comprises a housing member 10 adapted to be rigidly fixed to a portion of the casing, such as the exterior cover 11 of a turbine. Associated with the housing member 10 is a mass 12 which is connected to such housing member 10 by flexible elements in the form of weak leaf springs 13 which afford resistance-free relative vertical movement therebetween. The mass 12 including the weight of the pickup coil means 2 to which same is attached, relative to the slight pickup value of the weak leaf springs 13 is such that the coil means and mass may be said to be seismically mounted. By virtue of this arrangement, vibration forces to which the housing member 10 may be subjected by virtue of attachment to the turbine cover 11 will not be transmitted to the mass 12 and coil means 2 to the extent which would be necessary to move such coil means. Secured to the underside of a portion of the mass 12 are two electromagnets 14 and 15 which are spaced close to and face two electromagnets 16 and 17, respectively, attached to the housing member 10. These electromagnets are arranged so that the electromagnets 14 and 15 repel the electromagnets 16 and 17. A rod-like portion 20 of the mass 12 extends vertically downward from the housing member 10 to provide for the attachment of coil means 2 for suspension thereby under the influence of the repulsion effect of the magnets 14 to 17. The pickup coil means 2 includes a metal core member 22 which is attracted magnetically to the rotatable member 1 during energization of such coil means and such magnetic attraction is offset by the repulsion of magnets 14, 15 and 16, 17 to maintain such pickup coil means disposed away from such rotatable member. Adjustable spring means 23 interposed between the mass 12 and the housing member 10, provides for initial mechanical adjustment in the position of coil means 2 with respect to the rotatable member 1 during installation of the device, for example.

For energizing the pickup coil means 2, an oscillator 25 to generate 1000 c.p.s. at 115 volts, for example, is provided which is supplied with power such as 60 cycles and 115 volts from a supply of alternating current (not shown) by way of lines 26, 27 and a constant voltage transformer 28; one side of the secondary of transformer 28 being connected to oscillator 25 by way of a conductor 29, and the opposite side of such secondary being connected to oscillator 25 by way of ground.

The means 5 for controlling operation of the pickup coil adjusting means 3 is preferably in the form of a magnetic amplifier having load windings 32 and 33 and the usual saturation rectifiers 34 and 35, arranged to be energized with alternating current at 60 c.p.s., for example, by way of the conductor 29 and ground through the medium of branches of the conductor 38 and a bridge rectifier device 40 which supplies pulsating direct current to energize the electromagnets 14 to 17 according to the output of load coils 32 and 33 of means 5. The magnetic amplifier comprises the usual series arranged bias windings 42 and 43 which are energized with pulsating direct current supplied thereto from conductor 29 and ground by way of a full-wave rectifier device 44 and an adjusting resistance means 45 for regulating current through bias windings 42 and 43 to enable the magnetic amplifier device to be operable at the desired point of reference. A pair of control windings 47 and 48 are arranged to be fed with direct current from a full-wave rectifier 50 fed according to an average carrier current as varied by the pickup coil means 2 over the period of a vibration cycle or a plurality of such cycles, twelve, for example, as averaged under the influence of a smoothing capacitor 51 and adjustable resistance means 54.

The oscillator 25 is preferably of 1000 cycles and 115 volt output and is connected in series with the pickup coil means 2 via a conductor 52, the upper portion of adjustable resistance means 56, a conductor 58, the primary winding 59 of a signal extracting transformer 60 a conductor 61 and ground. The output of the oscillator 25 is also connected in series with control windings 47, 48, by way of the conductor 52, rectifier 50, a conductor 62, an adjustable resistance means 63, conductor 61, pickup coil means 2, and ground, and also by way of conductor 61, primary winding 59 of transformer 60, conductor 58, contact arm of resistance means 56, the lower portion of such resistance means, and ground. The primary winding 59 of signal extracting transformer 60 may be considered as the detector of a bridge circuit having arms consisting of the control windings 47, 48, resistance means 63, and pickup coil means 2 as one branch thereof connected in series between the output of the oscillator 25, and the upper and lower portions of resistance means 56 connected in series with the output of the oscillator 25 as the other branch thereof.

Once the various adjustable resistance means 45, 54, 56 and 63 have been properly adjusted for suitable operation, rotation of the rotatable member 1 in presence of vibration will alternately move such shaft toward and away from pickup coil means 2 at a frequency proportional to the speed of rotation of such rotatable member and of a displacement magnitude determined by the degree of vibration. During each revolution of such rotatable member 1, as same approaches the pickup coil means 2, the inductance of such coil means increases, and when such rotatable member moves away from coil means 2, the inductance of the latter will decrease. The 1000 cycle current from the oscillator 25 flowing through pickup coil means 2 thus will become modulated by the variable inductance effect of rotatable member 1 thereon. The magnitude of current variation through pickup coil means 2 caused by vibration of the rotatable member 1 will be proportional to the degree of vibration of such member. As a result of such vibration modulation of the 1000 cycle carrier current flowing through pickup coil means 2, a corresponding vibration modulated signal is fed unidirectionally through the control windings 47 and 48 of the magnetic amplifier device via the full-wave rectifier 50 under the influence of capacitor 51 which is of sufficient capacitance to effectively smooth out the vibration modulation frequency, corresponding to speed of rotation of rotatable member 1, so that current supplied to such control windings 47 and 48 will not vary to any material extent relative to speed of rotation of rotatable member 1 but rather will be an average value for perhaps twelve or more shaft revolutions. The pulsating direct current resultant from rectification of the 1000 cycle alternating current signal emanating from oscillator 25 will be effectively smoothed out as seen by control windings 47 and 48 due to the time constant characteristics of device 5.

From the foregoing, it will be seen that should the pickup coil means 2 tend to move toward or away from the rotatable member 1 or vice versa, as the case may be, the direct current is supplied to the control windings 47 and 48 of the magnetic amplifier device as averaged over a member or rotations of members, will correspondingly regulate the amount of current supplied from source 26, 27, 28 via its load windings 32 and 33 to the electro-magnets 14 and 17 of adjusting means 3 by way of the rectifier 40 to thereby automatically adjust position of pickup coil means 2 with respect to the rotatable member 1, to assure that such pickup coil means is automatically maintained at a substantially constant desired optimum average distance with respect to the rotatable member 1 without contact therewith.

The means 6 for effecting indication of the magnitude of vibration of the rotatable member 1 comprises the signal extracting transformer 60 and further includes, for sake of illustration, a full-wave rectifier 66 which rectifies the vibration modulated 1000 cycle output from transformer 60. The rectified signal output from rectifier 66 is filtered by a capacitor 67-resistor 68-inductor 69 arrangement so that across capacitor 67 there appears a direct current voltage with a superimposed alternating current ripple which is of the vibration modulation frequency. This alternating current ripple passes through a capacitor 70 as alternating current and is rectified by a full-wave rectifier 71 which renders such ripple available as direct current for operating an indicator 72, which may be in the form of a direct current meter calibrated in terms of magnitude of shaft vibration. An adjustable resistor 73 is connected across the output of the rectifier 71 for adjustment purposes.

While the vibration detector device embodying the invention has been described in connection with employment of an oscillator device providing a signal of such as 1000 cycles per second which is modulated at a vibration frequency of, for example, 60 cycles per second or less corresponding to rotation of the member 1 at 3600 r.p.m., it should be pointed out that applicant's device is not necessarily limited to such oscillator frequency, but rather, in accord with the essence of such feature, to a frequency which is sufficiently high with respect to changes in vibration modulation frequency as to enable the vibration signal extracting transformer 60 to operate efficiently irrespective of changes in the vibration modulation frequency.

Since numerous changes may be made in the above described construction of applicant's vibration detector device without departing from the spirit and scope thereof, it is intended that all matter contained in the foregoing description or shown in the accompanying drawing, shall be interpreted as illustrative and not in a limiting sense.

I claim as my invention:

1. A device for detecting radialwise vibration of a turbine shaft without employment of a shaft rubbing element and without influence by vibration of the turbine casing, said device comprising signal producing means including a pickup member for disposition adjacent to a peripheral surface of said shaft to produce an electrical signal responsively to the degree of proximity of said pickup member to such surface, connecting means interposed between said turbine casing and pickup member to permit relative movement therebetween in a direction toward and away from said shaft, said pickup member having sufficient mass associated therewith relative to the force-transmitting characteristics of said connecting means to prevent vibratory movement of said pickup member in the direction of said shaft responsively to vibration of said turbine casing, means responsive to the aforesaid electrical signal to indicate degree of shaft vibration, signal-averaging means for averaging said signal over a period of time exceeding that of a single vibration cycle, and means including electro-magnet means to magnetically locate said pickup member responsively to the averaged signal from said signal-averaging means.

2. A device for detecting radialwise vibration of a turbine shaft without employment of a shaft rubbing element and without influence by vibration of the turbine casing, said device comprising signal producing means including a pickup member for disposition adjacent to a peripheral surface of said shaft to produce an electrical signal responsively to the degree of proximity of said pickup member to such surface, said pickup member being in form of an induction coil and metal core assemblage to vibration modulate a carrier current, connecting means interposed between said turbine casing and pickup member to permit relative movement therebetween in a direction toward and away from said shaft, said pickup member having sufficient mass associated therwith relative to the force-transmitting characteristics of said connecting means to prevent vibratory movement of said pickup member in the direction of said shaft responsively to vibration of said turbine casing, means responsive to the aforesaid electrical signal to indicate degree of shaft vibration, signal-averaging means for averaging said signal over a period of time exceeding that of a single vibration cycle, and means including electromagnet means to magnetically locate said pickup member responsively to the averaged signal from said signal-averaging means for automatically maintaining said pickup member disposed a certain average distance away from the vibrating shaft in the presence of magnetic attraction of such member toward said shaft, irrespective of change in average position of the vibrating shaft.

References Cited in the file of this patent

UNITED STATES PATENTS

| | | |
|---|---|---|
| 2,078,796 | Greentree et al. | Apr. 27, 1937 |
| 2,302,219 | Hostetler | Nov. 17, 1942 |
| 2,559,919 | Gustafsson | July 10, 1951 |
| 2,847,625 | Popowsky | Aug. 12, 1958 |
| 2,879,470 | Wright | Mar. 24, 1959 |